Oct. 19, 1937.  F. V. A. E. ENGEL  2,096,032
FLOWMETER
Filed Nov. 7, 1935  2 Sheets-Sheet 1
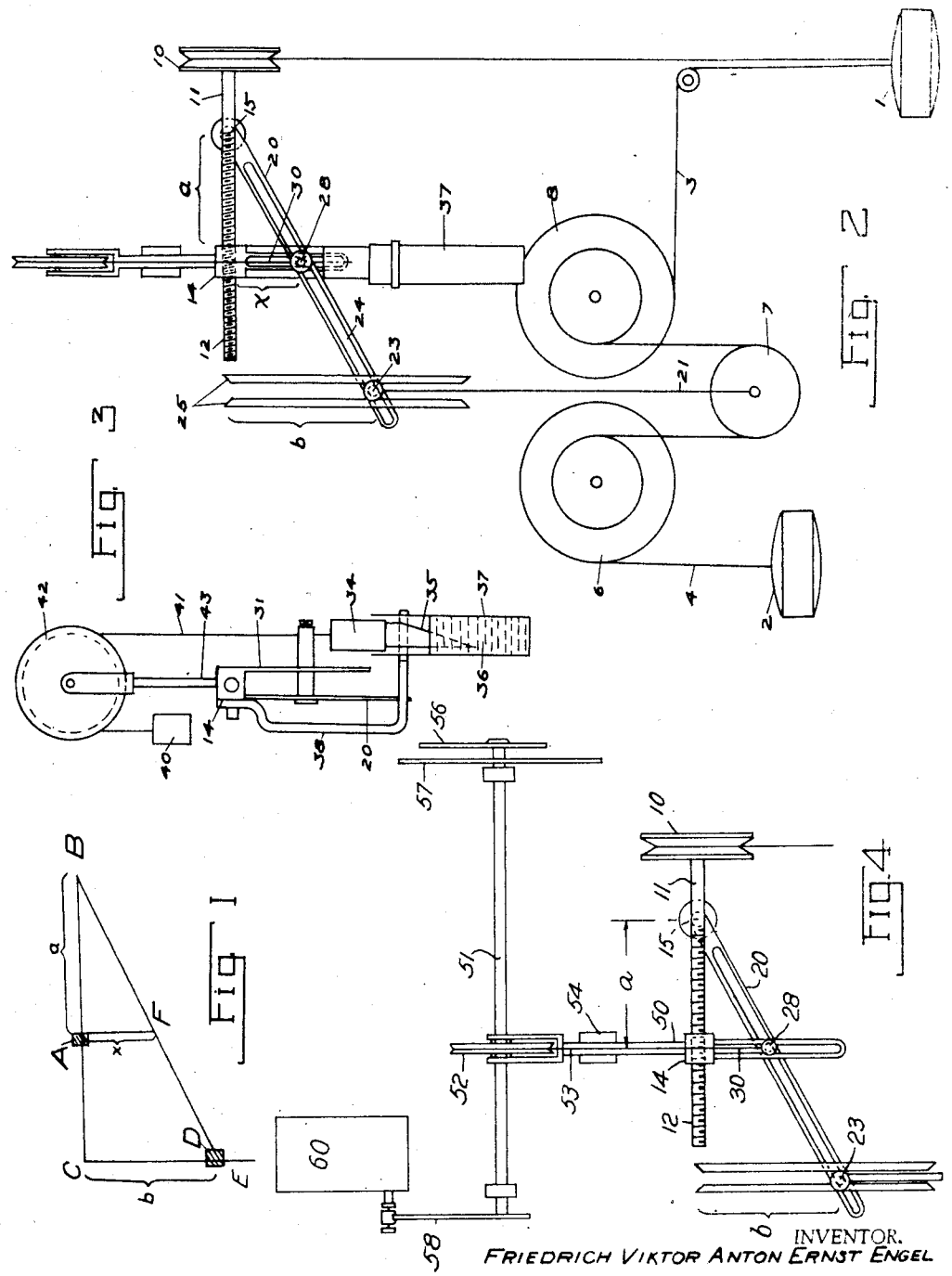
INVENTOR.
FRIEDRICH VIKTOR ANTON ERNST ENGEL
BY McConkey & Booth
ATTORNEYS.

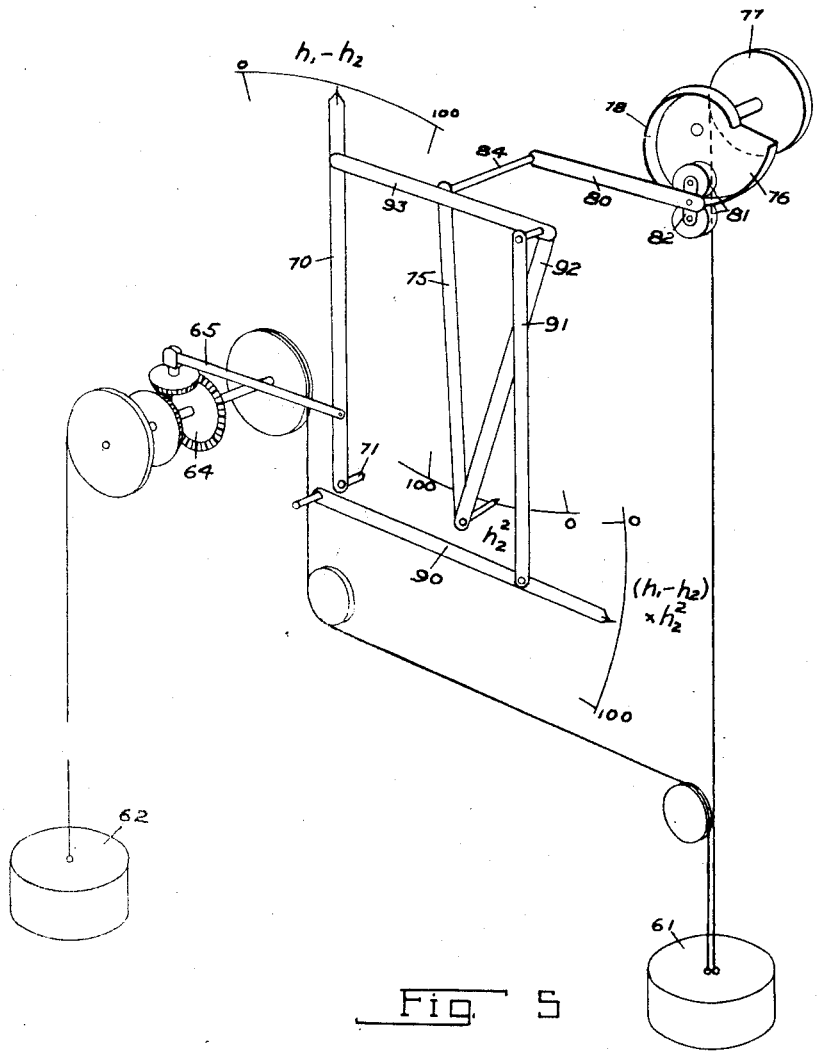

Patented Oct. 19, 1937

2,096,032

UNITED STATES PATENT OFFICE 2,096,032

FLOWMETER

Friedrich Viktor Anton Ernst Engel, London, England, assignor to Republic Flow Meters Company, Chicago, Ill., a corporation of Illinois Application November 7, 1935, Serial No. 48,666
In Great Britain December 3, 1934

9 Claims. (Cl. 73—215)

This invention relates to flowmeters and more particularly to meters for measuring the rate of flow in open channels or in pipes not running full.

It is extremely difficult to measure directly the flow of fluid in an open channel or partially filled pipe but it can be computed by measuring different functions of the fluid or flow which can be combined according to known formulae to ascertain the rate of flow. For example flow can be computed by solving, according to suitable formulae, readings of the fluid level over a weir, a Venturi flume or other suitable constriction in the conduit and of some physical property of the fluid such as its viscosity or density. Flow can also be computed from readings of the differential head at the throat of a weir or Venturi flume and at a point upstream thereof and of the head at one of said points. The last mentioned computation may be made according to the formula:

$$Q = kwh_2\sqrt{h_1 - h_2}$$

where $Q$=the rate of flow,
$w$=the width of the throat of the Venturi flume or weir,
$h_1$=the level of liquid upstream of the flume or the height of liquid above the crest of the weir at the upstream side thereof,
$h_2$=the level of liquid in the throat of the flume or the height of liquid above the crest of the weir, and
$k$=a constant.

In many instances, the value of one of the factors to be compounded is many times that of the other and, frequently difficulties or inaccuracies are experienced or introduced in combining or compounding the factors since a small error in one may be greatly increased when multiplied by or compounded with the other factor.

One of the objects of the present invention is to provide an improved and simple form of device or instrument for measuring fluid flow characteristics by compounding two factors of the nature indicated and one or both of which vary with the flow of the fluid, the said device or instrument possessing a high degree of accuracy under all conditions of working.

The invention consists in a device or instrument for measuring fluid flow characteristics or rates of flow comprising two members displaceable with variations in functions which vary with the fluid flow and which can be combined to give a resultant which is a function of the flow characteristic or rate of flow to be measured, wherein one member is movable along a rectilinear path and towards and away from a fixed zero point in that path whilst the other is coupled to an element movable angularly about a stationary pivot so that it traverses a path which is transverse to said rectilinear path, the arrangement being such that the resultant to be measured can be ascertained or determined by the distance from the rectilinear path of a point lying on a line drawn from the said pivot to the member traversing the transverse path.

According to another arrangement the different readings may be combined and the equation solved by utilizing a novel calculating linkage including a plurality of pivotally interconnected links.

Other objects, advantages and novel features will appear from the following detailed description taken in connection with the accompanying drawings in which:

Figure 1 is an explanatory diagram;
Figure 2 is a diagrammatic view of one embodiment of the invention;
Figure 3 is a view of a part of the embodiment of Figure 2 taken at right angles to Figure 2;
Figure 4 is a partial view similar to Figure 2 illustrating an alternative arrangement; and
Figure 5 is a view similar to Figure 2 illustrating another alternative arrangement.

It will be seen from Figure 1 that, if a member A is caused to traverse a path BC so that its distance $a$ from the point B is proportional to one function of the fluid flow and another member D is caused to traverse another path CE arranged at right angles to the path BC so that its distance $b$ from the point C is proportional to another flow function or characteristic, then the length $x$ of the line AF, where F is the point of intersection between the line BD and a line drawn parallel with the path CE, will be proportional to the product of the functions represented by the distances $a$ and $b$. This is apparent from the equation:—

$$\frac{a}{BC} = \frac{x}{b}$$

and, since BC=constant,
$x$ varies as the product of $a$ and $b$.

Similarly, if the member A moves as in Figure 1 and the member D is caused to traverse an arcuate path about the point B as a center (as is indicated in Figure 2) so that the length of the arc CD or the angle CBD varies proportionally to a second flow function or characteristic, then the length $x$ of the smaller arc AF (which is parallel to the arc CD) will be proportional to the product of the functions represented by the distances $a$ and $b$.

Usually, in practice, it is less difficult to measure the length of a straight line or path than it is that of a curved one and, consequently, even in instances in which the member D is caused to traverse an arcuate path, it may be found expedient to measure the lengths of the vertical tangents or the chords of the arcs rather than the lengths of the arcs themselves and to apply to these measurements a correction factor to compensate for the differences between the lengths of the arcs and the lengths of the corresponding chords or tangents.

From the foregoing it will be appreciated that by making one of functions $a$ and $b$ proportional to one flow factor or characteristic and the other function proportional to another flow factor or characteristic, the value $x$ can be utilized as a measure of the product of such factors. For instance, $a$ may be made proportional to one continually varying flow measurement and $b$ may be made proportional to a varying correction or compensating factor so that the value $x$ can be utilized as a corrected or compensated resultant. Also, one of the functions, for example, the function $b$ may be made proportional to the square root of the differential head $h_1-h_2$ hereinbefore referred to and the other function may be made proportional to the head $h_2$ so that the value $x$ can be utilized as a measure of the rate of flow of liquids in open channels or weirs or conduits not running full of liquid.

As an example of one mode of carrying the invention into effect, there is illustrated diagrammatically in Figures 1 and 2 one form of device or instrument which may be used for measuring the flow of liquids in open channels or weirs, or conduits not running full of liquid and in which the function $a$ is made proportional to $h_2{}^2$ and the function $b$ is made proportional to the differential head $h_1-h_2$, which functions are compounded according to the equation:—

$$Q^2 = k^2 w^2 h_2{}^2 (h_1 - h_2)$$

It is to be understood, however, that the instrument may be employed for compounding various other flow characteristics or functions.

In Figure 2, 1 indicates a float member located in a chamber communicating with the throat of a Venturi flume and 2 indicates another float member located in a chamber in communication with the upstream side of the flume. To the floats 1 and 2 are attached cords 3 and 4 respectively, one of which passes to one side of a differential gear made up of three pulley wheels indicated at 6, 7 and 8 and the other of which passes to the other side of said differential gear. The pulley wheels 6 and 8 are rotatable about fixed axes and the pulley wheel 7 is suspended from the other two pulleys so that it is free to move vertically in such a manner that its movements are proportional to the difference between the level of the liquid at the throat and that at the upstream of the flume. The float 1 is also coupled to a second pulley 10 carried by a spindle 11 formed with a screw thread 12 adapted, upon rotation of the spindle, to cause an internally threaded carriage 14 to travel along the spindle so that its displacement $a$ from a zero point 15 is proportional to the square of the value $h_2$ measured by the float. This may be effected readily by forming the pulley 10 in the form of a square cam, but any other suitable means may be used to accomplish the same result.

Disposed at an angle to the spindle 11 is a lever 20 the pivotal axis of which coincides substantially with the zero point 15 above referred to. Near its free end the lever 20 is coupled, as, for example, by a link 21, with the spindle of the pulley 7 so that the lever is adapted to be moved about its pivotal point 15 as the pulley 7 rises and falls and the angle of inclination of the lever to the spindle is varied, the arrangement preferably being such that the coupling between the upper end of the link 21 and the lever 20 enables the movements of said upper end to be constrained to a vertical path. For instance, the coupling means may be of the pin and slot type comprising a pin 23 upon the upper end of the link 21 sliding in a slot 24 formed in the lever 20, the pin also being constrained by guides 25 to follow a vertical path so that the distance $b$ between the axis of the pin 23 and the axis of the spindle 11 will, under all conditions, be proportional to the differential head $h_1-h_2$.

Hence $x$ varies as the product of the square of the head $h_2$ and the differential head $h_1-h_2$ and, consequently, as the square of the rate of flow. The arrangement, therefore, includes another pin 28 which is slidable within the slot 24 of the lever 20 and also within another slot 30 which is vertically disposed and is formed in a depending portion 31 of the horizontally slidable carriage 14, the vertical distance of the centre of the pin 28 from the axis of the spindle 11 thus corresponding with the value $x$.

In order to give a direct reading of the rate of flow, suitable means are preferably provided for extracting the square root of the value $x$. In the arrangement illustrated such means include an electrical resistance device 34 of the type illustrated and described in the patent to Spitzglass No. 1,959,743, comprising a plurality of contact rods 35 of different lengths connected at their upper ends to resistances or resistance sections (not shown) which are preferably wound on one or more spools accommodated in the upper part of the device. The contact rods are arranged so that they are adapted to dip into a body of mercury or other electrically conducting liquid 36 contained in a casing 37 which may be carried by a bracket 38 depending from the underside of the horizontally slidable carriage 14. The resistance device is suitably connected with the slidably mounted pin 28 so that it is adapted to rise and fall with the pin and the weight of the resistance device is preferably counterbalanced by a counterweight 40 attached to a cord 41 passing over a pulley 42 suitably supported in position as, for example, by a bracket 43 extending upwardly from the horizontally slidable carriage 14. Also the casing 37 and the upper end of the resistance device are connected in an electrical circuit so that, as the resistance descends, the number of contact rods dipping into the mercury will be increased and more and more of the resistance sections will be short-circuited. Hence, the effective resistance of the resistance device will be varied as the pin 28 rises and falls with variations in the value of $x$ and by suitably arranging the decrements of length between successive or neighbouring contact rods, the apparatus can be caused to function so that the current flowing in the electrical measuring circuit is at all times directly proportional to the square root of the distance $x$ and hence proportional to the rate of flow.

Figure 4 shows an alternative means for extracting the square root of the value $x$ in which the horizontally slidable carriage 14 is provided with an upwardly extending bracket 50 of bifurcated formation the upper end of which is slidable along a horizontally disposed shaft 51. The said shaft is of square cross section or formed with suitable keyway and is provided between the two arms of the bracket 50 with a pulley 52 slidable along the shaft but rotatable therewith. Around the pulley 52 is passed a cord 53 one end of which is connected to the pin 28 and the other end thereof is connected to a counterweight 54. By this arrangement the pulley is displaceable along the shaft 51 to follow the horizontal movements of the pin 28 and the shaft is adapted to be rotated proportionally to the vertical movements of such pin. Hence, by providing the shaft 51 with a pointer 56 movable over a dial 57 suitably calibrated for the extraction of square roots, the rate of flow can readily be ascertained or indicated. Also, if an integrator is employed, a square root cam 58 may be mounted upon the shaft 51 so that it is interposed between the shaft and the operating element of an integrator indicated diagrammatically at 60.

Figure 5 shows an alternative arrangement by which the invention may be carried into effect, which arrangement incorporates a linkage mechanism in place of the above-described mechanisms. In this arrangement, 61 indicates the float member located in a chamber communicating with the throat of a Venturi flume, or the crest of a weir, and 62 indicates the other float member located in a chamber in communication with the upstream side of the flume or weir. To the floats are attached cords passing to opposite sides of a differential gear 64 so that a lever 65 which is pivotally connected to the differential receives a movement proportional to the differential head $h_1 - h_2$. To the free end of the lever 65 is connected one of the operating arms of the linkage, for example, the arm 70 which is pivoted at its lower end upon a stationary pivot 71 so that the said arm is also moved proportionally to the differential head. Also the float 61 is coupled to a second operating arm of the linkage, namely the arm 75 which is pivoted at its upper end for movement about a fixed axis 84 which is in line with the arm 70 when the latter is in its maximum or 100% position and included in the coupling is a suitable means for enabling the arm 75 to receive an angular movement proportional to the square of the head $h_2$ measured by the float 61. In the arrangement shown, such means include a cam 76 carried by the spindle of a pulley 77 coupled to the float 61, the said cam being formed with an edge flange 78 the curvature of which with respect to the axis of the pulley 77 is such that the movements imparted to a member operated by the cam are proportional to the square of the movements imparted to the pulley. The member operated by the cam is here shown as a lever 80 having two rollers or followers 81 mounted upon opposite ends of an equalizer bar 82 which is centrally pivoted upon the lever 80 so that the flange 78 is embraced by the two rollers 81, the opposite end of the lever 80 being secured to the spindle 84 upon which the second operating arm 75 is rigidly secured for movement thereby. The third or indicator arm of the linkage is indicated at 90 and is arranged so that it is capable of angular movement about a fixed axis coaxial with that about which the arm 70 is movable. The arms 90, 75 and 70 are interconnected by a linkage system comprising three additional arms 91, 92 and 93 which are pivotally connected together at one end and are connected at their opposite ends to the free ends of arms 90, 75 and 70 respectively. The arms 70 and 75 and links 91 and 92 are of the same effective length and so are arm 90 and link 93.

With this arrangement movement of the arm 90 is proportional to the product of the movement of the arms 70 and 75 and the product of the quantities indicated by the arms 70 and 75 will be indicated by the arm 90. Hence, the movement of the indicator arm 90 will be proportional to the square of the rate of flow and it will be appreciated that there may be readily obtained from this movement a reading directly proportional to the rate of flow.

It will also be appreciated that the improved instrument produced in accordance with the present invention possesses, in addition to the advantages outlined in the opening parts of this specification, the further advantage that suitable scales may, if desired, be arranged adjacent elements which are adapted to move proportionally to the factors to be compounded as indicated in Figure 5 so that the individual values of these factors can be read and the measurements readily checked should this be found necessary or desirable.

While several embodiments of the invention have been shown and described it will be apparent that many changes might be made therein and it is not intended that the scope of the invention shall be limited to the forms shown or otherwise than by the terms of the appended claims.

What is claimed is:

1. A flowmeter for measuring the flow of fluid through a conduit having an obstruction having a throat therein comprising a member displaceable in direct proportion to the differential head between a point at the throat of the obstruction and a point upstream thereof and a member displaceable in accordance with the head at one of said points, means moved by said last named member in accordance with the square of the displacement thereof, and means moved jointly by said first named member and said means to indicate a function of the rate of flow of the fluid.

2. A flowmeter for measuring the flow in a conduit having an obstruction having a throat therein comprising a float responsive to the level at the throat of the obstruction, a float responsive to the level at a point upstream of the obstruction, differential mechanism connected to said floats, a member movable by said mechanism in direct proportion to the differential of the movement of said floats, a second member, means to move said second member proportionately to the square of the movement of one of the floats, and means operated by both of said members for indicating a function of the rate of flow of the fluid.

3. A flowmeter comprising two members movable according to the heads at two points in a stream to be measured, differential mechanism connected to said two members, an element moved by said mechanism in direct proportion to the difference between said heads, means for guiding said element in a rectilinear path, a second element, means connecting said second element to one of said members to be moved thereby in accordance with the square of the corresponding head, means for guiding said second element in a rectilinear path transverse to said first path, and means connected to said elements to be moved thereby according to a function of the rate of flow.

4. A flowmeter comprising two members movable according to the heads at two points in a stream to be measured, differential mechanism connected to said two members, an element moved by said mechanism, means for guiding said element in a rectilinear path, a second element, means connecting said second element to one of said members to be moved thereby in accordance with the square of the corresponding head, means for guiding said second element in a rectilinear path transverse to said first path, a link pivoted adjacent one end of said second path and connected to said first element to have its position controlled thereby, and a member guided by said second element to move in a path parallel to said first path and connected to said link to be moved thereby according to a function of the rate of flow.

5. A flowmeter for measuring the flow of fluid in a conduit having an obstruction having a throat comprising a member movable in accordance with the head at a point in the throat of the obstruction, a member movable in accordance with the head at a point upstream of the obstruction, a differential mechanism connected to both of said members, an element moved by said differential mechanism in accordance with the difference in said heads, a second element, means connecting the second element to one of said members to move said second element in accordance with the square of the corresponding head, and means connected to said elements to be operated thereby and including a part movable in accordance with the product of the movements of said elements and proportionately to the square of the rate of flow.

6. A flowmeter for measuring the flow of fluid in a conduit having an obstruction having a throat comprising a member movable in accordance with the head at a point in the throat of the obstruction, a member movable in accordance with the head at a point upstream of the obstruction, a differential mechanism connected to both of said members, an element moved by said differential mechanism in accordance with the difference in said heads, a second element, means connecting the second element to one of said members to move said second element in accordance with the square of the corresponding head, and means connected to said elements to be operated thereby and including a part movable in accordance with the product of the movements of said elements and proportionately to the square of the rate of flow, and means operated by said part for indicating the square root of the movement of said part.

7. A flowmeter for measuring the flow of fluid in a conduit having an obstruction having a throat comprising a member movable in accordance with the head at a point in the throat of the obstruction, a member movable in accordance with the head at a point upstream of the obstruction, a differential mechanism connected to both of said members, an element moved by said differential mechanism in accordance with the difference in said heads, a second element, means connecting the second element to one of said members to move said second element in accordance with the square of the corresponding head, and means connected to said elements to be operated thereby and including a part movable in accordance with the product of the movements of said elements and proportionately to the square of the rate of flow, an electrical measuring circuit, and a variable resistance in said circuit operated by said part for varying the resistance in the circuit in proportion to the square root of the movement of said part.

8. A flowmeter comprising two members movable in accordance with the heads at two points in a fluid stream, differential mechanism connected to said members, a pivotally mounted arm operated by said differential mechanism in accordance with the difference in the heads at said two points, a second pivoted arm, means connecting one of said members to the second arm to move it proportionately to the square of the head at the corresponding point, a third arm, and linkage connecting said arms and so constructed and arranged that said third arm will be moved proportionately to the product of the movements of said two arms or to the square of the rate of flow.

9. A flowmeter comprising two members movable in accordance with the heads at two points in a fluid stream, differential mechanism connected to said members, a pivotally mounted arm operated by said differential mechanism in accordance with the difference in the heads at said two points, a second pivoted arm, means connecting one of said members to the second arm to move it proportionately to the square of the head at the corresponding point, a third arm, and linkage connecting said arms and so constructed and arranged that said third arm will be moved proportionately to the product of the movements of said two arms or to the square of the rate of flow, said three arms and the links comprising said linkage being of the same length.

FRIEDRICH VIKTOR
ANTON ERNST ENGEL.